J. J. BLACK.

Assignor to THE BLACK SPRING AND GEAR COMPANY.

VEHICLE RUNNING GEAR.

No. 11,120. Reissued Nov. 11, 1890.

WITNESSES.

Frank Miller.

Albert H. Baker.

INVENTOR.

John J. Black

By his attorney

E. G. Thurston

THE NORRIS PETERS CO., PHOTO-LITHO., WASHINGTON, D. C.

UNITED STATES PATENT OFFICE.

JOHN J. BLACK, OF CLEVELAND, OHIO, ASSIGNOR TO THE BLACK SPRING AND GEAR COMPANY, OF OHIO.

VEHICLE RUNNING-GEAR.

SPECIFICATION forming part of Reissued Letters Patent No. 11,120, dated November 11, 1890.

Original No. 392,712, dated November 13, 1888. Application for reissue filed September 19, 1890. Serial No. 365,553.

*To all whom it may concern:*

Be it known that I, JOHN J. BLACK, a citizen of the United States, residing at Cleveland, in the county of Cuyahoga and State of Ohio, have invented certain new and useful Improvements in Vehicle Running-Gear, of which the following is a specification.

This invention relates to running-gear for vehicles, and pertains to that portion thereof which is commonly called the "fifth-wheel." It has for its object to greatly simplify the construction and to reduce the number of parts comprising such gear, at the same time producing a more durable, better-working, and easier-managed gear. To accomplish these results I construct this portion of the vehicle running-gear substantiallay as hereinafter described, and illustrated in the accompanying drawings, in which—

Figure 4:
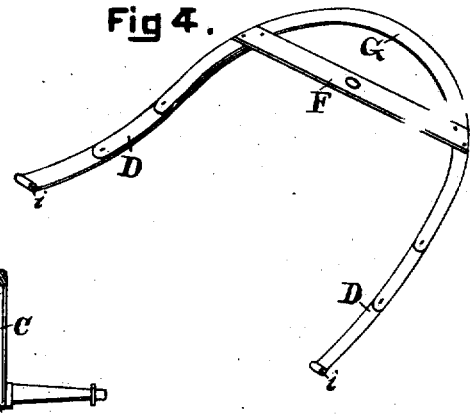
Figure 3:
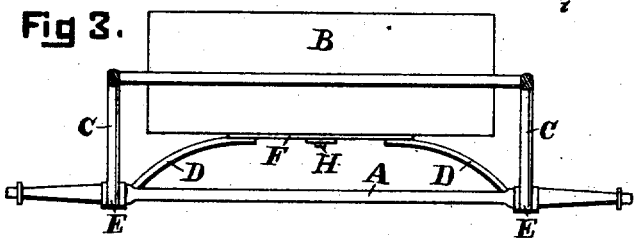
Figure 2:
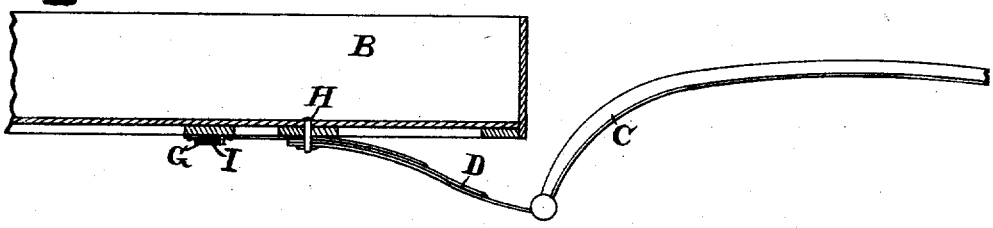
Figure 1:
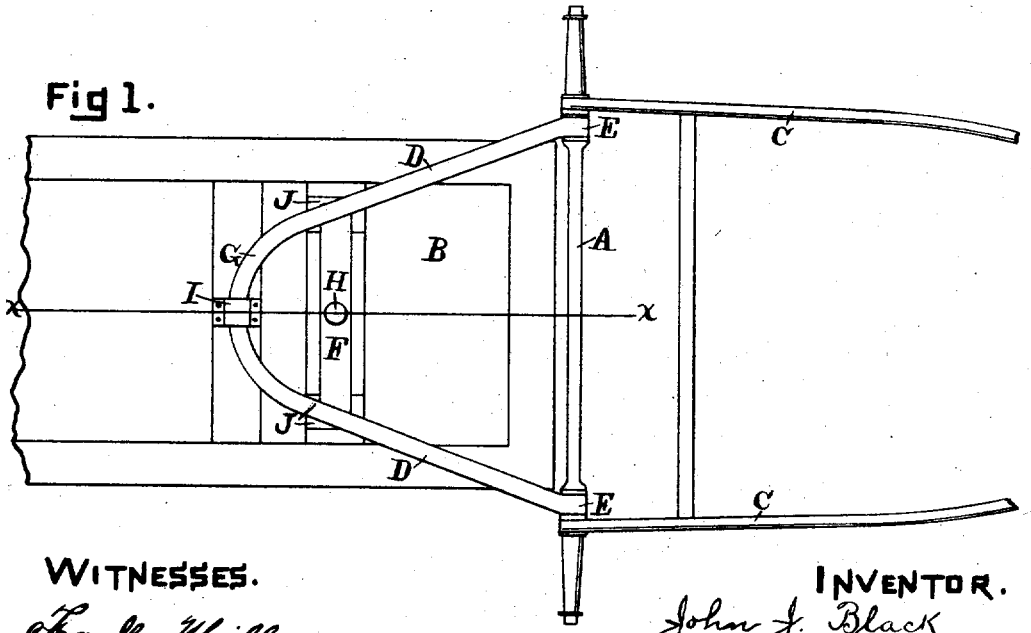

Figure 1 is an under side view of a wagon, showing my improved gear as applied thereto. Fig. 2 is a longitudinal section of the same on line *x x* of Fig. 1. Fig. 3 is a front elevation of the same. Fig. 4 is a detached view of the springs and part of the fifth-wheel combined.

A represents the front axle, and B the body, of a road-wagon.

C C are the shafts used in hauling the wagon. These shafts are rigidly attached to the axle by any suitable means, instead of being joined thereto by the ordinary shackles or couplings.

D D are springs, the forward ends of which are attached to the axle at widely-separated points by clips E E, having pintles passing through eyes *i i* on the ends of the springs. The springs converge toward their inner ends, thus making it practical to use a small fifth-wheel, while the body has a wide support at the axle. A cross-bar F extends from one spring to the other and is rigidly secured at its ends to both. G represents a segment-bar situated behind the cross-bar F, which segment-bar is also in rigid connection with the springs D D. The cross-bar F is attached to the body B by a king-bolt H, which passes through a sill or strong bottom of the body, and an orifice *f* in the cross-bar, said orifice being at substantially the center of curvature of the segment-bar.

I is a bracket attached to the under side of the body and extending beneath the segment-bar G, which rides upon it and is upheld by it.

Rub-plates J J may be also attached to the bottom of the body or sill for the cross-bar to rub against when turning.

Having described my invention, what I claim is—

1. In combination, the springs D D, converging toward their inner ends, a cross-bar rigidly connected with said springs, which cross-bar is provided with an orifice for the reception of the king-bolt, a segment-bar behind the cross-bar and in rigid connection with said springs, the center of curvature of said segment-bar being in the orifice in the bar F, provided for the king-bolt, and a bracket adapted to be attached to the wagon-body and to extend under the segment-bar, substantially as and for the purpose specified.

2. The combination, with the forward end of a wagon-body and the forward axle, of two side springs, the outer ends of which are suitably secured to the axle near the wheels, a cross-bar, a king-bolt pivotally connecting said cross-bar and body, a segment-bar arranged behind said cross-bar, the inner ends of the springs, the cross-bar, and segment-bar being rigidly connected together, a bracket secured to the body and extending beneath the segment-bar, and rub-plates secured to the body and engaging with the cross-bar, substantially as and for the purpose specified.

JOHN J. BLACK.

Witnesses:
E. L. THURSTON,
FRANK MILLER.